(12) United States Patent
Takeda et al.

(10) Patent No.: US 6,186,896 B1
(45) Date of Patent: *Feb. 13, 2001

(54) OPERATING DEVICE WITH ANALOG JOYSTICK

(75) Inventors: Genyo Takeda; Kenichiro Ashida; Shigeru Miyamoto; Yasunari Nishida, all of Kyoto (JP)

(73) Assignee: Nintendo Co., Ltd., Kyoto (JP)

( * ) Notice: Under 35 U.S.C. 154(b), the term of this patent shall be extended for 0 days.

This patent is subject to a terminal disclaimer.

(21) Appl. No.: 09/081,968

(22) Filed: May 20, 1998

Related U.S. Application Data

(63) Continuation of application No. 08/765,472, filed as application No. PCT/JP96/01067 on Apr. 19, 1996, now Pat. No. 5,984,785.

(30) Foreign Application Priority Data

May 10, 1995 (JP) ...................................... 7-137298

(51) Int. Cl.[7] ........................................................ A63F 9/24
(52) U.S. Cl. ................................ 463/38; 463/36; 463/37; 273/148 B
(58) Field of Search ................................ 463/36, 37, 38; 273/148 B; 345/156, 161

(56) References Cited

U.S. PATENT DOCUMENTS

| D. 316,879 | 5/1991 | Shulman et al. . |
| D. 317,946 | 7/1991 | Tse . |
| D. 357,712 | 4/1995 | Wu . |
| D. 363,062 | 10/1995 | Hung . |
| D. 375,326 | 11/1996 | Yokoi et al. . |
| 3,666,900 | 5/1972 | Rothweiler et al. . |
| 3,729,129 | 4/1973 | Fletcher et al. . |
| 3,827,313 | 8/1974 | Kiessling . |
| 4,148,014 | 4/1979 | Burson . |

(List continued on next page.)

FOREIGN PATENT DOCUMENTS

| 90881/91 | 11/1990 | (AU) . |
| 32 04 428 | 8/1983 | (DE) . |

(List continued on next page.)

OTHER PUBLICATIONS

3D Ballz Instruction Booklet, Accolade, San Jose, California, #3050–00231 Rev. A.

6 Photographs of Sony Play Station: 1)top case and compact disk; 2)hand controller; 3)internal circuit (top view); 4)internal circuit boards(top view); 5)compact disk reader(bottom view); and internal main board (bottom view).

Knuckles Chaotix Instruction Manual; Sega; Redwood City, California, #84503 (1995).

(List continued on next page.)

*Primary Examiner*—Valencia Martin-Wallace
*Assistant Examiner*—Julie Kasick
(74) *Attorney, Agent, or Firm*—Nixon & Vanderhye P.C.

(57) ABSTRACT

An operating device is, while in use, connected to an image processor which generates image data of an image to be displayed on a monitor on the basis of a program. The operating device is provided with an analog joystick in addition to a plurality of switches, and outputs operation signals by which the image data can be modified according to an operation by an operator. The analog joystick includes a lever having a tip end which is protruded from a housing and inclined in an arbitrary direction including North, South, East and West. There is provided with a guide ring which includes a guide wall having an octagonal outer edge around the lever, and the guide wall guides the lever to eight corners, that is, upper, lower, left, right, rightupper, right-lower, left-upper and left-lower corners.

19 Claims, 12 Drawing Sheets

U.S. PATENT DOCUMENTS

| | | |
|---|---|---|
| 4,161,726 | 7/1979 | Burson et al. . |
| 4,315,113 | 2/1982 | Fisher et al. . |
| 4,359,222 | 11/1982 | Smith, III et al. . |
| 4,469,330 | 9/1984 | Asher . |
| 4,538,035 | 8/1985 | Pool . |
| 4,552,360 | 11/1985 | Bromley et al. . |
| 4,575,591 | 3/1986 | Lugaresi . |
| 4,587,510 | 5/1986 | Kim . |
| 4,639,225 | 1/1987 | Washizuka . |
| 4,659,313 | 4/1987 | Kuster et al. . |
| 4,685,678 | 8/1987 | Frederiksen . |
| 4,747,441 | 5/1988 | Brzezinski . |
| 4,789,932 | 12/1988 | Cutler et al. . |
| 4,858,930 | 8/1989 | Sato . |
| 4,868,780 | 9/1989 | Stern . |
| 4,875,164 | 10/1989 | Monfort . |
| 4,887,230 | 12/1989 | Noguchi et al. . |
| 4,887,966 | 12/1989 | Gellerman . |
| 4,890,832 | 1/1990 | Komaki . |
| 4,916,440 | 4/1990 | Faeser et al. . |
| 4,924,216 | 5/1990 | Leung . |
| 4,933,670 | 6/1990 | Wislocki . |
| 4,974,192 | 11/1990 | Face et al. . |
| 4,976,429 | 12/1990 | Nagel . |
| 4,976,435 | 12/1990 | Shatford et al. . |
| 5,001,632 | 3/1991 | Hall-Tipping . |
| 5,012,230 | 4/1991 | Yasuda . |
| 5,046,739 | 9/1991 | Reichow . |
| 5,095,798 | 3/1992 | Okada et al. . |
| 5,160,918 | 11/1992 | Saposnik et al. . |
| 5,203,563 | 4/1993 | Loper, III . |
| 5,207,426 | 5/1993 | Inoue et al. . |
| 5,213,327 | 5/1993 | Kitaue . |
| 5,237,311 | 8/1993 | Mailey et al. . |
| 5,245,320 | 9/1993 | Bouton . |
| 5,259,626 | 11/1993 | Ho . |
| 5,286,024 * | 2/1994 | Winblad ........................... 273/148 B |
| 5,290,034 | 3/1994 | Hineman . |
| 5,329,276 | 7/1994 | Hirabayashi . |
| 5,358,259 | 10/1994 | Best . |
| 5,388,990 | 2/1995 | Beckman . |
| 5,390,937 | 2/1995 | Sakaguchi et al. . |
| 5,393,070 | 2/1995 | Best . |
| 5,393,071 | 2/1995 | Best . |
| 5,393,072 | 2/1995 | Best . |
| 5,393,073 | 2/1995 | Best . |
| 5,394,168 | 2/1995 | Smith, III et al. . |
| 5,415,549 | 5/1995 | Logg . |
| 5,421,590 | 6/1995 | Robbins . |
| 5,436,640 | 7/1995 | Reeves . |
| 5,451,053 | 9/1995 | Garrido . |
| 5,459,487 | 10/1995 | Bouton . |
| 5,473,325 | 12/1995 | McAlindon . |
| 5,512,920 | 4/1996 | Gibson . |
| 5,513,307 | 4/1996 | Naka et al. . |
| 5,515,044 | 5/1996 | Glatt . |
| 5,551,693 * | 9/1996 | Goto et al. ............................. 463/37 |
| 5,551,701 | 9/1996 | Bouton et al. . |
| 5,558,329 | 9/1996 | Liu . |
| 5,563,629 | 10/1996 | Caprara . |
| 5,566,280 | 10/1996 | Fukui et al. . |
| 5,577,735 | 11/1996 | Reed et al. . |
| 5,589,854 | 12/1996 | Tsai . |
| 5,593,350 | 1/1997 | Bouton et al. . |
| 5,607,157 | 3/1997 | Nagashima . |
| 5,615,083 | 3/1997 | Burnett . |
| 5,624,117 | 4/1997 | Ohkubo et al. . |
| 5,628,686 | 5/1997 | Svancarek et al. . |
| 5,632,680 | 5/1997 | Chung . |
| 5,640,177 | 6/1997 | Hsu . |
| 5,643,087 | 7/1997 | Marcus et al. . |
| 5,649,862 | 7/1997 | Sakaguchi et al. . |
| 5,653,637 | 8/1997 | Tai . |
| 5,663,747 | 9/1997 | Shulman . |
| 5,670,955 | 9/1997 | Thorne, III et al. . |
| 5,680,534 | 10/1997 | Yamato et al. . |
| 5,684,512 | 11/1997 | Schoch et al. . |
| 5,691,898 | 11/1997 | Rosenberg et al. . |
| 5,704,837 * | 1/1998 | Iwasaki et al. ........................ 463/38 |
| 5,706,029 | 1/1998 | Tai . |
| 5,714,981 | 2/1998 | Scott-Jackson et al. . |
| 5,731,806 | 3/1998 | Harrow et al. . |
| 5,734,373 | 3/1998 | Rosenberg et al. . |
| 5,759,100 | 6/1998 | Nakanishi . |
| 5,769,719 | 6/1998 | Hsu . |
| 5,784,051 | 7/1998 | Harrow et al. . |
| 5,785,597 | 7/1998 | Shinohara . |
| 5,786,807 | 7/1998 | Couch et al. . |
| 5,791,994 | 8/1998 | Hirano et al. . |
| 5,793,356 | 8/1998 | Svancarek et al. . |
| 5,804,781 | 9/1998 | Okabe . |
| 5,808,591 | 9/1998 | Mantani . |
| 5,820,462 | 10/1998 | Yokoi et al. . |
| 5,838,330 | 11/1998 | Ajima . |
| 5,862,229 | 1/1999 | Shimizu . |
| 5,896,125 | 4/1999 | Niedzwiecki . |
| 5,973,704 | 10/1999 | Nishiumi et al. . |
| 5,984,785 * | 11/1999 | Takeda et al. ........................ 463/38 |
| B1 4,870,389 | 6/1997 | Ishiwata et al. . |

FOREIGN PATENT DOCUMENTS

| | | |
|---|---|---|
| 40 18 052 | 12/1990 | (DE) . |
| 268 419 | 5/1988 | (EP) . |
| 431 723 | 6/1991 | (EP) . |
| 0 470 615 | 2/1992 | (EP) . |
| 553 532 | 8/1993 | (EP) . |
| 685 246 | 12/1995 | (EP) . |
| 724 220 | 7/1996 | (EP) . |
| 2234575 | 2/1991 | (GB) . |
| 2 244 546 | 12/1991 | (GB) . |
| 2 263 802 | 8/1993 | (GB) . |
| 50-22475 | 3/1975 | (JP) . |
| 57-18236 | 1/1982 | (JP) . |
| 57-2084 | 1/1982 | (JP) . |
| 57-136217 | 8/1982 | (JP) . |
| 59-40258 | 3/1984 | (JP) . |
| 59-121500 | 7/1984 | (JP) . |
| 61-16641 | 1/1986 | (JP) . |
| 61-198286 | 9/1986 | (JP) . |
| 61-185138 | 11/1986 | (JP) . |
| 2-41342 | 3/1990 | (JP) . |
| 2-68404 | 5/1990 | (JP) . |
| 2-283390 | 11/1990 | (JP) . |
| 3-16620 | 1/1991 | (JP) . |
| 3-248215 | 11/1991 | (JP) . |
| 4-26432 | 1/1992 | (JP) . |
| 4-20134 | 2/1992 | (JP) . |
| 4-42029 | 2/1992 | (JP) . |
| 4-104893 | 9/1992 | (JP) . |
| 4-291468 | 10/1992 | (JP) . |
| 4-29148 | 10/1992 | (JP) . |
| 5-100759 | 4/1993 | (JP) . |
| 5-19925 | 5/1993 | (JP) . |
| 5-177057 | 7/1993 | (JP) . |
| 5-241502 | 9/1993 | (JP) . |
| 6-23148 | 2/1994 | (JP) . |
| 6-54962 | 3/1994 | (JP) . |
| 6-68238 | 3/1994 | (JP) . |
| 6-110602 | 4/1994 | (JP) . |
| 6-114683 | 4/1994 | (JP) . |
| 6-190145 | 7/1994 | (JP) . |

| | | |
|---|---|---|
| 6-190147 | 7/1994 | (JP). |
| 6-205010 | 7/1994 | (JP). |
| 6-61390 | 8/1994 | (JP). |
| 6-285259 | 10/1994 | (JP). |
| 6-315095 | 11/1994 | (JP). |
| 7068052 | 3/1995 | (JP). |
| 07088252 | 4/1995 | (JP). |
| 7-104930 | 4/1995 | (JP). |
| 7-144069 | 6/1995 | (JP). |
| 7-222865 | 8/1995 | (JP). |
| 7-288006 | 10/1995 | (JP). |
| 7-317230 | 12/1995 | (JP). |
| 8-45392 | 2/1996 | (JP). |
| 9-56927 | 3/1997 | (JP). |
| 62-269221 | 11/1997 | (JP). |
| WO 92/09347 | 6/1992 | (WO). |
| WO 94/12999 | 6/1994 | (WO). |
| WO97/17651 | 5/1997 | (WO). |
| WO97/32641 | 12/1997 | (WO). |

OTHER PUBLICATIONS

Nintendo Power, vol. 30, p. 22, Pilot Wings article.
Nintendo Power, vol. 31, p. 35, Pilot Wings article.
Nintendo Power, vol. 31, pp. 74–76, Pilot Wings article.
Nintendo Power, vol. 38, p. 25, Pilot Wings article.
Nintendo Power, vol. 46, Pilot Wings article.
Sega Force/ Saturn Tech Specs, Data Information, pp. 1–5, 1997.
Sega Force/ Saturn Tech Peripherals, Data Information, pp. 1–4, 1997–1999.
Super Mario 64 Player's Guide, Nintendo of America, 1996.
Nintendo Power, "The Fun Machine" for Nintendo 64, 1995.
Nintendo Power, vol. 80, pp. 20–27, Jan. 1996.
*Nintendo Employee Shosinkai Reports*, 14 pages, Nov. 24–26, 1995.
Drucker et al., "Cinema: A System for Procedural Camera Movements", *Proceedings of the Symposium on Interative 3D Graphics*, Cambridge, MA., Mar. 29–Apr. 1, 1992, pp. 67–70.
"Analog Joystick Interface Emulation Using a Digital Counter", IBM technical Disclosure Bulletin, vol. 37, No. 08, Aug. 1994, pp. 73–74.
"Hardware Reset With Microcode Warning Period", *IBM Technical Disclosure Bulletin*, vol. 33, No. 11, Arp. 1991, pp. 105–106.
*PilotWings Instruction Booklet*, Super Nintendo Entertainment Systems, NS–PW–USA, copyright 1991.
*PilotWings, It's a Festival of Flight*, Top Secret Password Nintendo Player's Guide, pp. 82–83 and 160, copyright 1991.
*PilotWings, Soar with the Flight Club*, Super Nintendo Entertainment System Play's Guide, pp. 100–105, copyright 1991.
*Sega Genesis 32X Instruction Manual*, Sega, Redwood City California, #672–2116 (1994).
*Sega Genesis Instruction Manual*, Sega, Hayward, California, #3701–926–0–01 (1994).
*Sonic 2 The Hedgehog Instruction Manual*, Sega, Hayward, California, #672–0944 3701–925–0–01 (1992).
Sony PlayStation Instruction Manual, and informational materials, Sony Computer Entertainment Inc. 1995.

\* cited by examiner

OPERATING DEVICE WITH ANALOG JOYSTICK

This is a continuation of application Ser. No. 08/765,472, filed Jan. 9, 1997, now U.S. Pat. No. 5,984,785, which is a 371 of PCT/TP96/01067 filed Apr. 19, 1996.

FIELD OF INVENTION

The present invention relates to an operating device with an analog joystick More specifically, the present invention relates to an operating device with an analog joystick, which is, while in use, connected to an image processor which generates image data of an image to be displayed on a monitor such as a television receiver and or the like, and outputs operation signals which can modify the image data, that is, the image according to an operation by an operator.

BACKGROUND AND BRIEF SUMMARY OF THE INVENTION

A conventional game machine controller 1 (first prior art controller) shown in FIG. 1 includes a rectangular housing 1a, a select switch 3 for selecting a game content, a start switch 2 for designating a start of the game, a cross direction switch 4 for designating a moving direction of a game character during the game, and two action switches 5a and 5b for selecting or designating an action of the character, all the switches being provided on an upper surface of the housing 1a. Since a processing capability (a processing capability of a CPU) of a conventional game machine was relatively low in comparison with a present game machine, it was possible to sufficiently enjoy the game with using first prior art controller 1. However, as the game content became more complex, it became impossible to sufficiently control the action of the character by using only the two action switches 5a and 5b.

Therefore, a game machine controller 1 (second prior art controller) shown in FIG. 2 has been proposed and put into practical use. In the second prior art controller 1, various kinds of switches are provided on an upper surface of a housing 1a' having a circular surface. More specifically, in the second prior art controller 1, in addition to the select switch 3, the start switch 2 and the cross direction switch 4, four action switches 5a, 5b, 5c and 5d are provided on the surface of the housing 1a', and two switches 6a and 6b are provided on a rear surface of the housing 1a' at positions that index fingers or middle fingers of both hands can reach while the palms of both hands are brought into contact with left and right side surfaces of the housing 1a'.

In the second prior art controller 1, an outer shape of the housing is designed in a manner that the side surfaces of the housing 1a' fit the palms of both hands when grasping the housing 1a'. Accordingly, the switches can be operated without large movements of the fingers. The action switches 5c and 5d, and the left and right switches 6a and 6b are newly provided. Therefore, the operator can operate the respective switches without looking at them and thus watch the screen of the monitor only. However, in a case of a game that it is required to frequently and rapidly operate a plurality of switches, there was a possibility that a positional relationship between the controller and the hands, i.e. a positional relationship between the respective switches and the fingers might change from an original positional relationship.

Therefore, a controller 1 (third prior art controller) shown in FIG. 3, in which no change occurs in the positional relationship between the controller and the hands has been proposed and put into practical use. In the third prior art controller 1, a cross direction switch 4a and action switches 5a and 5b, and a cross direction switch 4b and action switches 5c and 5d are arranged on left and right housings 1a and 1b, respectively. Furthermore, there are provided with two grips 7a and 7b extended from the housings 1a and 1b, and grooves 8a and 8b are formed on rear surfaces of the grips 7a and 7b. By firmly holding the grips 7a and 7b by inserting fingers into the grooves 8a and 8b, it is possible to securely restrict the hands of an operator, i.e. maintain fingers at constant positions, and therefore, the respective switches can be surely operated.

On the other hand, in the prior art controllers shown in FIG. 1 to FIG. 3, a direction signal for designating a direction that an image on the monitor is to be moved is outputted by utilizing the cross direction switch 4 or 4a (and 4b). However, in the conventional cross direction switch, switch contacts are provided at four directions of upper (North), lower (South), left (West) and right (East) on the monitor screen, that is, at four directions of front, rear, left and right in a case where the controller is viewed in plain. A according to a switch contact being turned-on, the direction signal which designates one of the four directions can be outputted. That is, the cross switches provided in the conventional controllers is a kind of digital joystick. Therefore, there was a problem that the operator could not designate an arbitrary direction other than one of the four directions.

Accordingly, it is possible to consider that there is provided with an analog joystick on such a game machine controller. Meanwhile, a term "analog joystick" means a device which is provided with a lever, and can output a direction signal determined by a direction in which the lever is inclined. In such an analog joystick, there is an advantage that it is possible to designate all directions in 360 degrees. However, there is a further disadvantage to be solved that an operation of the lever is insecure.

More specifically, if a finger is detached from the lever to release the operation of the lever, the lever returns to its home position (normally, a position that the lever stands upright). Although the lever is secure at the home position, a position of a finger of the operator primarily defines a direction that the lever is inclined or an amount that the lever is inclined. Thus, it is difficult for a person who can not finely control the position of the finger to stably operate the lever. A controller for television game machine for home use is normally held by hands of the operator to operate respective switches or keys provided on the controller. In a case where the analog joystick is provided on such a hand-holdable controller, the above described problem that the operation of the lever can not be securely performed becomes more significant.

Therefore, in a case where a controller with an analog joystick is used in a home video game machine, for example, it is possible to easily determine that there is a problem wherein a movable character can not be moved in a desired direction when the direction that the movable character (image) displayed on the monitor screen is to be finely controlled on the screen with the analog joystick. Especially, in the video game, there are a relatively larger number of scenes wherein the movable character is continuously moved in one direction without zigzagging, and in such a scene, a stable operation of the analog joystick is especially required.

Therefore, a principal object of the present invention is to provide a novel operating device with an analog joystick, which is capable of being securely operated while being held by hands.

Another object of the present invention is to provide an operating device with an analog joystick, which is capable of securely outputting a direction signal in a desired direction.

Another object of the present invention is to provide an operating device with analog joystick, which is capable of continuously and securely outputting the direction signal even if it is desired that a designated direction is to be finely changed.

An operating device for image processor according to the present invention is, while in use, connected to an image processor which generates image data of an image to be displayed on a monitor, and outputs an operation signal by which the image data can be changed according to an operation by an operator, the operating device comprising: a hand-holdable housing; and an analog joystick provided on the housing, wherein the analog joystick includes a lever having a tip end which protrudes from a hole of the housing and is inclined in an arbitrary direction including upper, lower, left and right, and a guide member which is attached to the housing and guides the lever in at least a direction equal to up (North) on the monitor screen.

When the operator intends to incline the lever toward the up direction, it is possible to extremely securely incline the lever in the up direction by merely inclining the lever according to the guide member. Therefore, in an image processor such as a video game machine for home use and etc., it is possible to surely move the movable character toward the up direction, that is, it is possible to make the movable character surely go straight on.

In a preferred embodiment, the guide member has a guide wall which is converged to a point indicative of up (North) on the monitor screen, and the lever is inclined while the same is being along with the guide wall, and finally, stably held at that point.

In another aspect of the present invention, an operating device is, while in use, connected to an image processor which generates image data of an image to be displayed on a monitor, and outputs an operation signal which can modify the image data according to an operation by an operator, and comprises: a housing; and an analog joystick provided on the housing, wherein the analog joystick includes a lever which is protruded from the housing and operable by a finger of a hand holding the housing and inclined in an arbitrary direction within 360 degrees, and the operating device further comprises at least one grip formed to be extended toward a front side from the housing, and by grasping the grip by the hand, the position of the hand is restricted by the grip.

In this aspect, by grasping the grip by the hand, the hand can be stably supported by the grip, and therefore, the position of the hand is defined by the grip. Therefore, the position of the finger of the hand can be also stably positioned at a constant position, and accordingly, it is possible to securely operate the lever of the analog joystick by the finger of the hand.

In another aspect of the present invention, an operating device with an analog joystick is a game machine controller which is connected to a game machine which generates image data according to a game program and displays a game character on a monitor according to the image data, and controls the game character on the monitor, and comprises: a housing having a surface long from side to side; a first operating means formed on the surface at a left side of the housing; a second operating means formed on the surface at a right side of the housing; a third operating means which includes a lever capable of being inclined, and formed on the surface of the housing in an area that the first operating means and the second operating means are not formed; and a protruded portion which is protruded toward a front side from the housing in the vicinity of at least one of the first operating means, the second operating means and the third operating means, and grasped by a palm of a hand of an operator, wherein one of the first operating means and the second operating means is used as a first moving direction designation input means which designates a moving direction of the game character, and the other is used as an action designation input means which designates other actions of the game character, and the third operating means is capable of being used instead of the first moving direction designation input means, and used as a second moving direction designation input means which designates at least the moving direction of the game character in accordance with an inclination of the lever.

Preferably, the third operating means is constructed by an analog joystick.

Since the grip or protruded portion is formed in the vicinity of the operating means, by grasping the grip by the hand, it is possible to easily set a positional relationship between the operating means and the hand.

Furthermore, if a first grip, a second grip and a third grip are provided in correspondence to the first operating means, the second operating means and the third operating means, respectively, and if a grip to be grasped is changed when an operating means which is used is to be changed according to a content of the game, it is possible to securely position the hand at a most suitable position for the operating means which is used.

The above described objects and other objects, features, aspects and advantages of the present invention will become more apparent from the following detailed description of the present invention when taken in conjunction with the accompanying drawings.

BEST MODE FOR EMBODYING THE INVENTION

In the following, an embodiment in which an operating device with an analog joystick according to the present invention is applied to a video game machine which displays a game character on a screen of a monitor in accordance with a game program stored in a memory device (semiconductor memory, CD-ROM and etc.) and controls the game character will be described. However, it is pointed-out in advance that the operating device with an analog joystick according to the present invention can be, while in use, connected to a multipurpose image processor which generates image data of an image to be displayed on the monitor in accordance with a program. In such a case, the operating device with an analog joystick outputs an operation signal which can modify the image data generated by the image processor, i.e. the image on the monitor in accordance with an operation by an operator.

Figure 1:
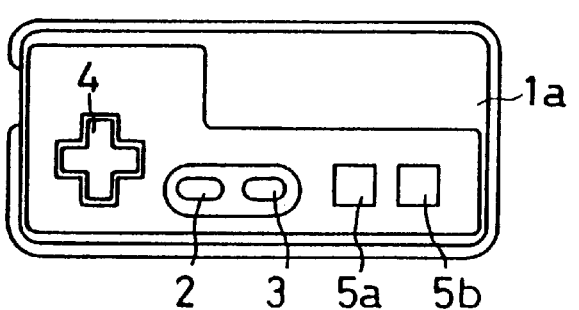
FIG. 1 is an illustrative view showing the first prior art.
Figure 2:
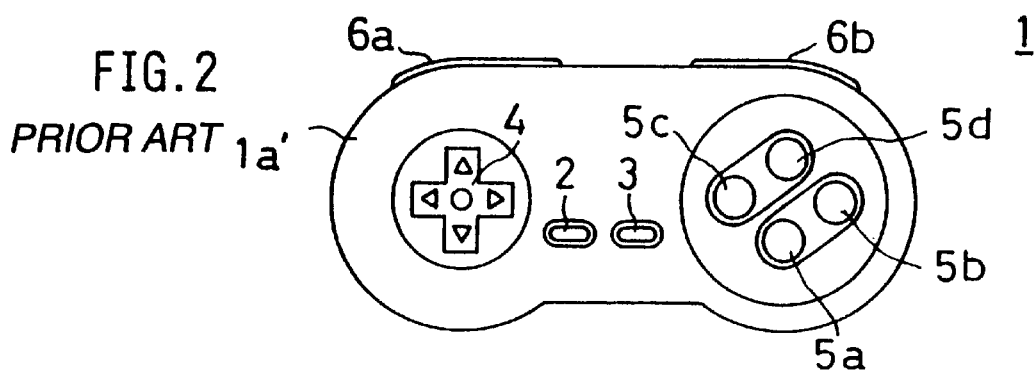
FIG. 2 is an illustrative view showing the second prior art controller.
Figure 3:
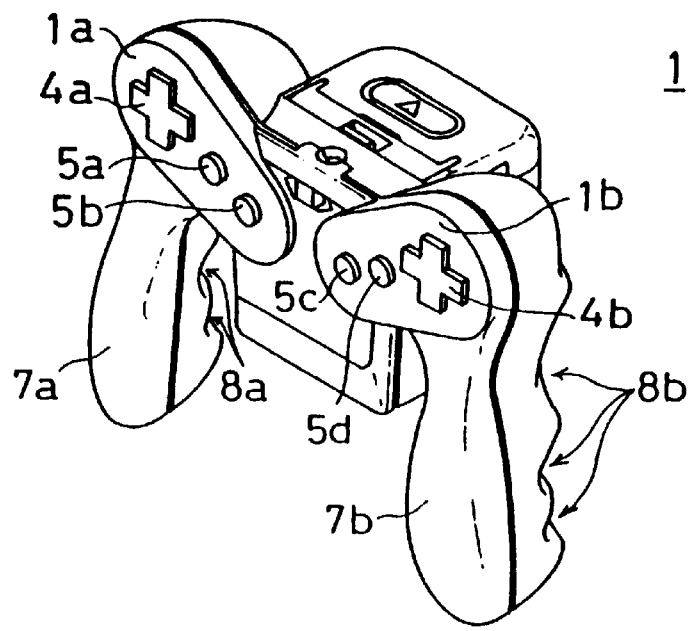
FIG. 3 is an illustrative view showing the third prior art controller.
Figure 4:
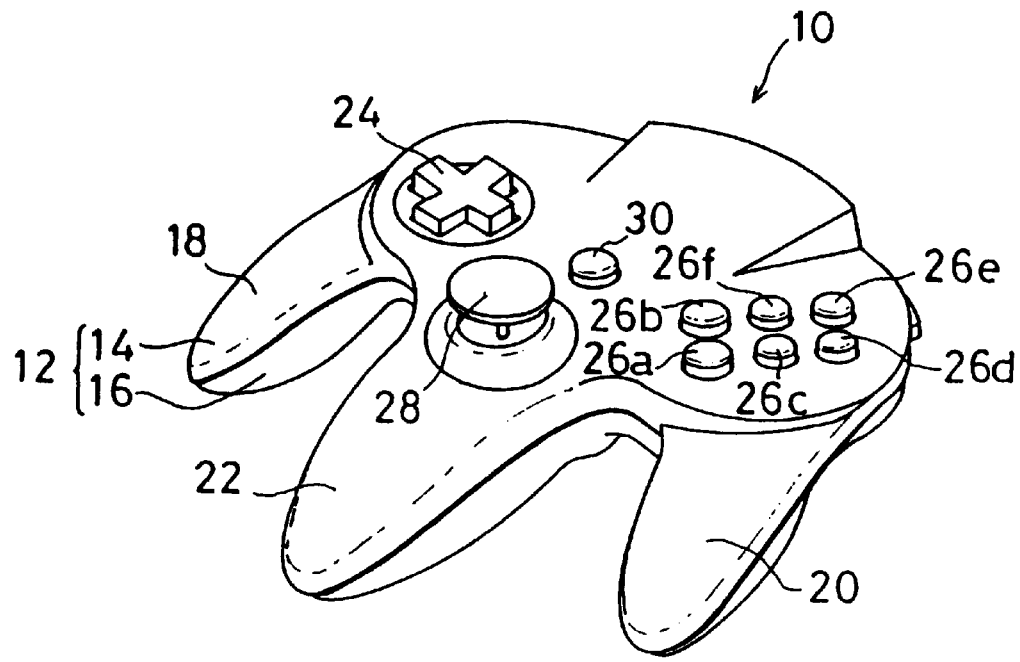
FIG. 4 is a perspective view showing one embodiment according to the present invention.
Figure 5:
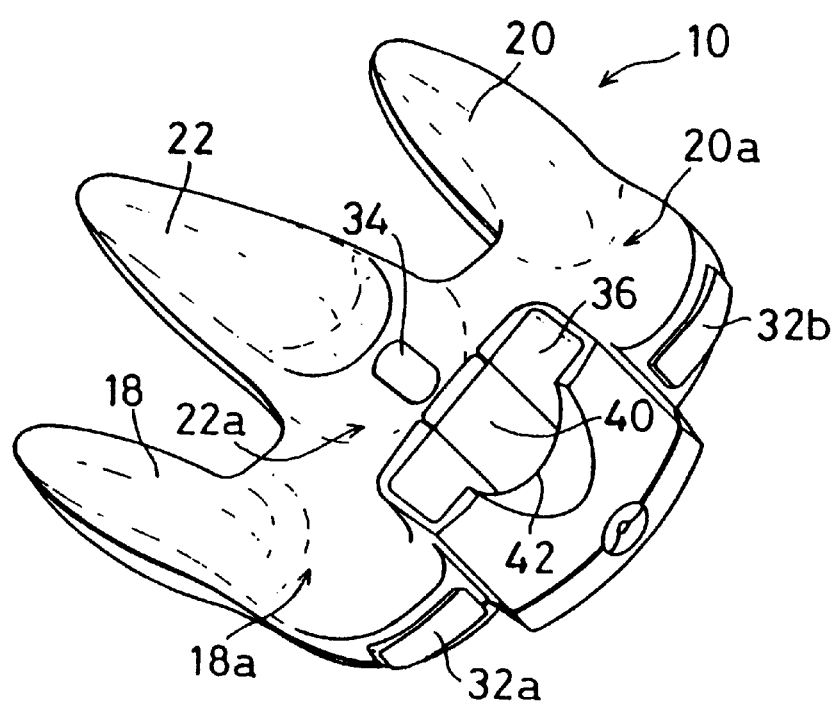
FIG. 5 is another perspective view showing the embodiment of FIG. 4.

With reference to FIG. 4 and FIG. 5, an operating device 10 of the illustrated embodiment includes a housing 12 consisting of an upper half 14 and a lower half 16. At both left and right ends of the housing 12, a left grip 18 and a right grip 20 are respectively formed in a manner such that they protruded toward a front side. At an intermediate position between the left grip 18 and the right grip 20, a center grip 22 is formed in a manner that the same is protruded toward the front side. A cross-direction designation switch 24 which is a digital joystick is formed on a surface of the housing 12 in the vicinity of a base end of the left grip 18. Action designation switches 26a, 26b, 26c, 26d, 26e and 26f which designate six (6) kinds of actions are respectively formed on the surface of the housing 12 in the vicinity of a base end of the right grip 20. An analog joystick 28 which is capable of designating all directions within 360 degrees is formed on the housing 12 in the vicinity of a base end of the center grip 22. At an approximately central position of the housing 12, a start switch 30 which designates a start of a game is formed. Furthermore, the start switch 30 is positioned approximately at the center of an area surrounded by the switches 24 and 26a to 26f, and the analog joystick 28.

In addition, the grips 18, 20 and 22 are respectively formed by protruded portions which are respectively uniformly formed on the upper half 14 and the lower half 16, and therefore, in the following, it is to be noted that there is a case where a term "housing" indicates a whole including the grips 18, 20 and 22.

Furthermore, a pair of side surface switches 32a and 32b are formed on a rear surface of the housing 12, and a bottom surface switch 34 is formed approximately at the center of the lower half 16 in the vicinity of the base end of the center grip 22.

Figure 17:
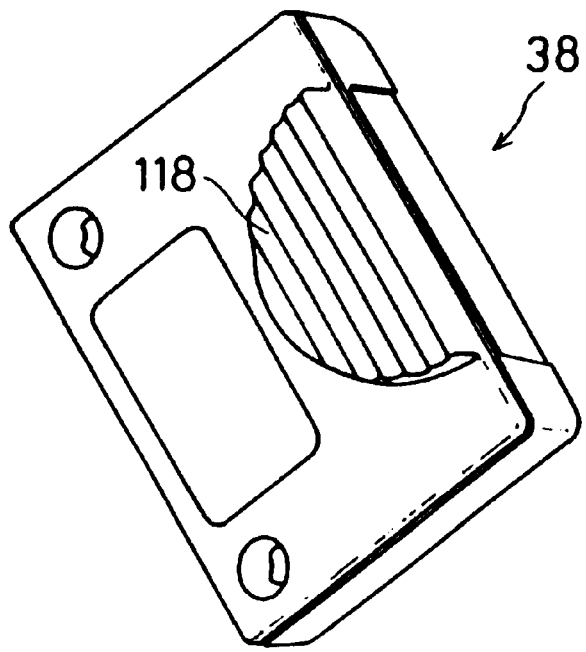
FIG. 17 is a front perspective view showing one embodiment of an expansion cartridge which is applied to the embodiment of FIG. 4.
Figure 18:
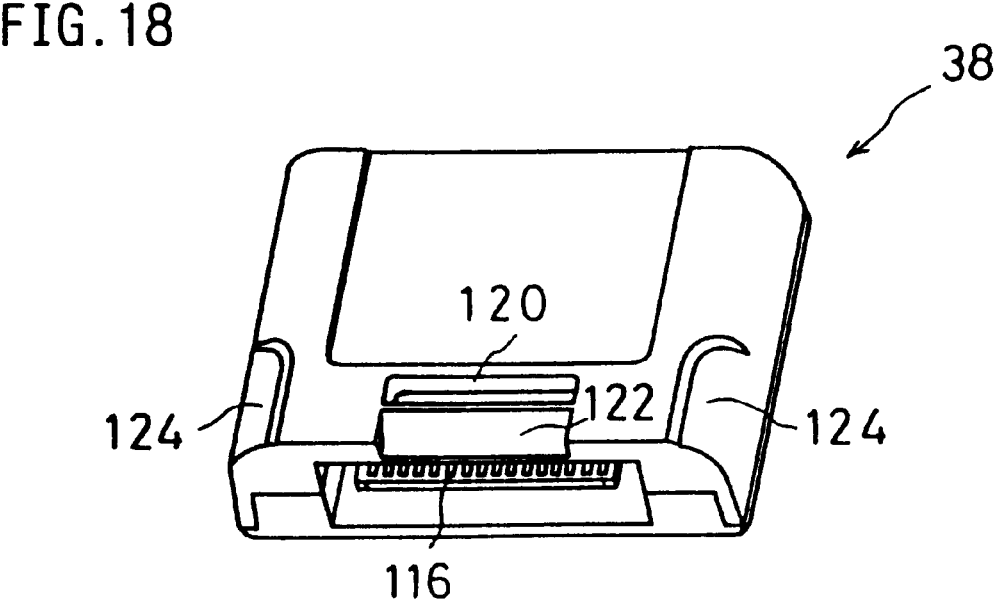
FIG. 18 is a rear perspective view showing the expansion cartridge embodiment of FIG. 17.
Figure 19:
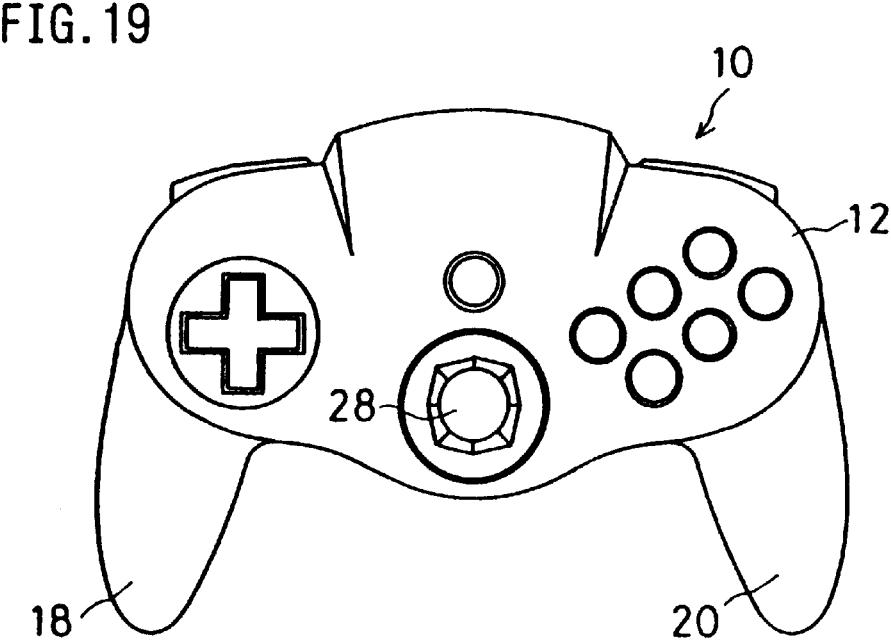
FIG. 19 to FIG. 22 are illustrative views respectively showing other embodiments according to the present invention.
Figure 20:
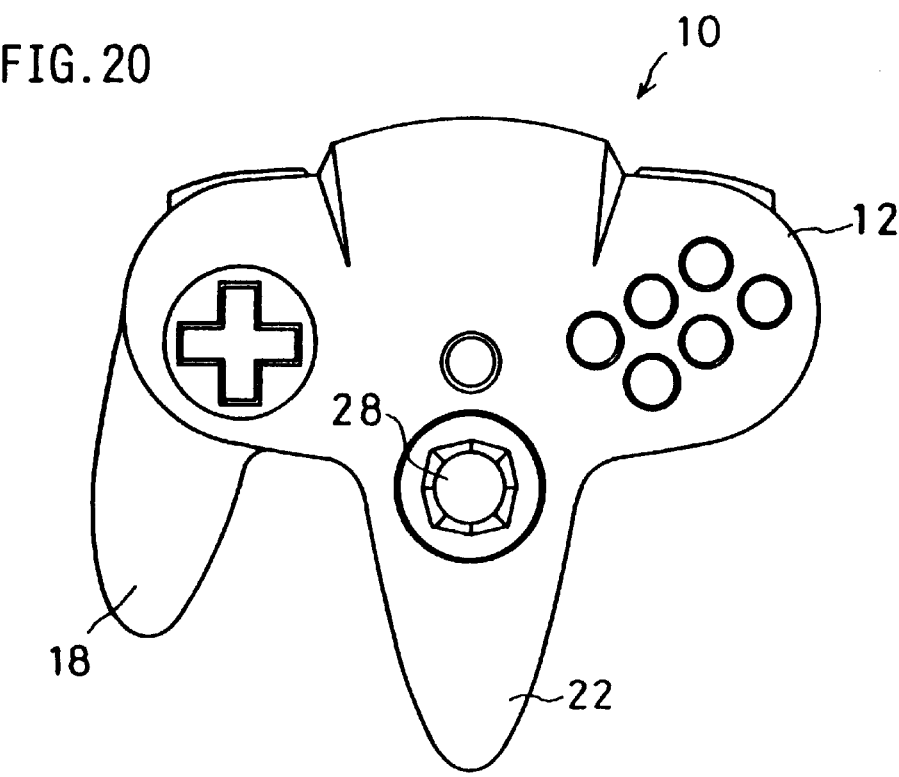

A rear surface of the lower half 16 is extended toward a bottom surface, and an opening portion 36 is formed at a tip end thereof. In an interior of the opening portion 36, a connector (not shown) to which an expansion cartridge 38 shown in FIG. 17 and FIG. 18 is connected is provided. Furthermore, a lever 40 for ejecting the cartridge 38 inserted into the opening portion 36 is formed at a position of the opening portion 36.

As can be seen from FIG. 5 in particular, recess portions 18a, 20a and 22a are formed on the lower half 16 of the housing 12 in the vicinity of the base ends of the grips 18a, 20 and 22, respectively. Each of the recess portions 18 to 22a is formed to extend in left and right directions at a position that a finger (e.g. middle finger) of a hand can be just received while the each of the grips 18 to 22 is grasped by the hand, as described later. Therefore, each of the recess portions 18a to 22a functions as a place at which the finger is positioned when each of the grips 18 to 22 is held by the hand. Furthermore, as shown at the grip 18 of FIG. 4, each of the grips 18 to 22 has a center portion which is formed between the base end portion and a tip end portion and is made thicker than the base end portion and the tip end portion. Therefore, when the grip is grasped by the hand, a finger of the hand (e.g. third finger) can engage to the thicker center portion, and therefore, even if the grip is softly grasped by the hand, the grip or controller 10 can not fall from the hand.

In addition, at a side opposite to the lever of the opening portion 36 to which the above described expansion cartridge 38 is inserted, a notch 42 is formed, and the notch 42 provides a space for withdrawing the expansion cartridge 38 in ejecting the expansion cartridge 38 with the lever 40.

Now, with referring to FIG. 6 to FIG. 10, the analog joystick 28 will be described in detail. The analog joystick 28 is constructed as a joystick unit shown in FIG. 6. The joystick unit is sandwiched by the upper half 14 and the lower half 16. The joystick unit includes a housing formed by a case 44 and a cover 46, and an inner case 48 is accommodated within the housing.

Figure 7:
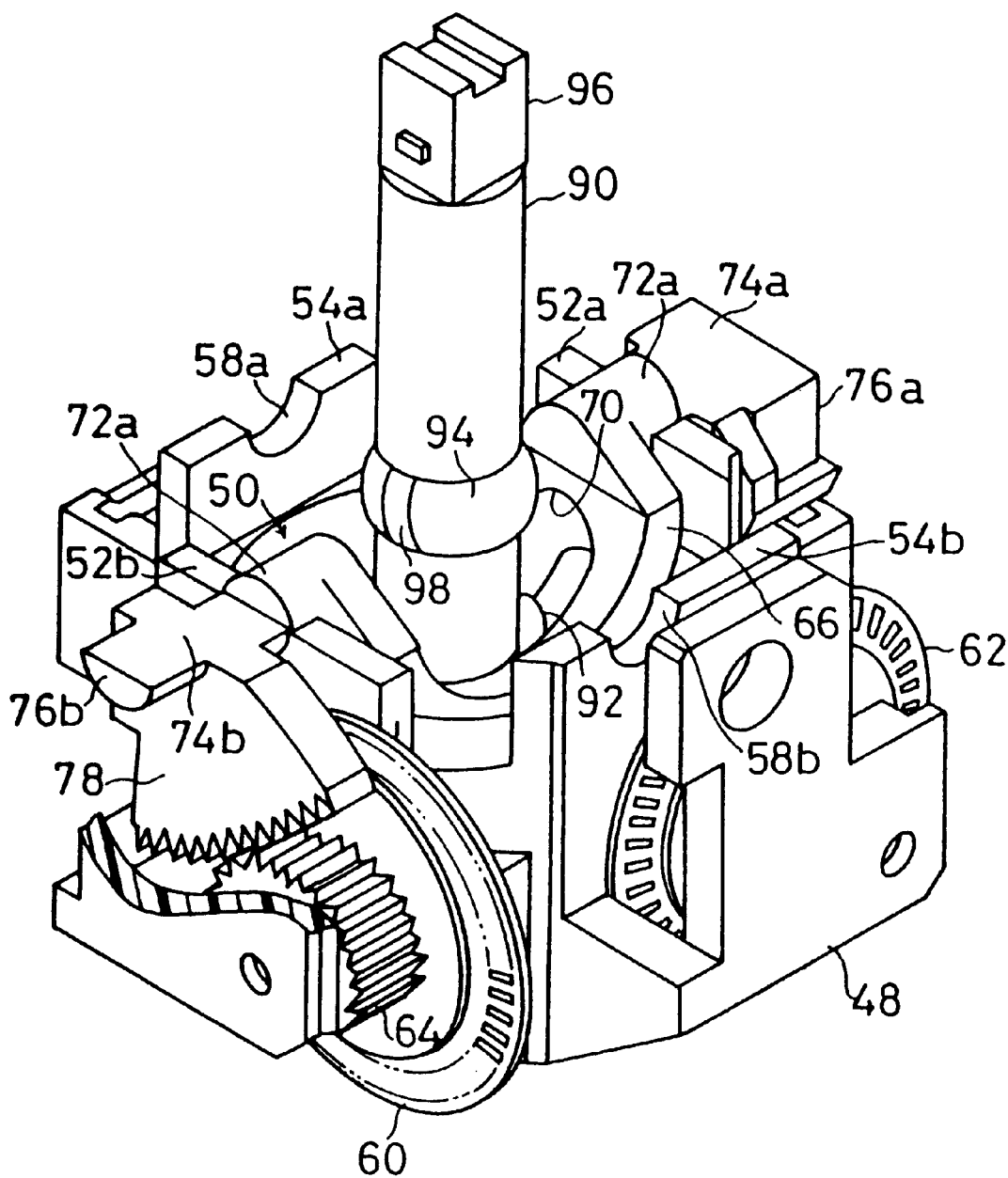
FIG. 7 is a perspective view showing a major portion of the joystick unit of FIG. 6.
Figure 8:
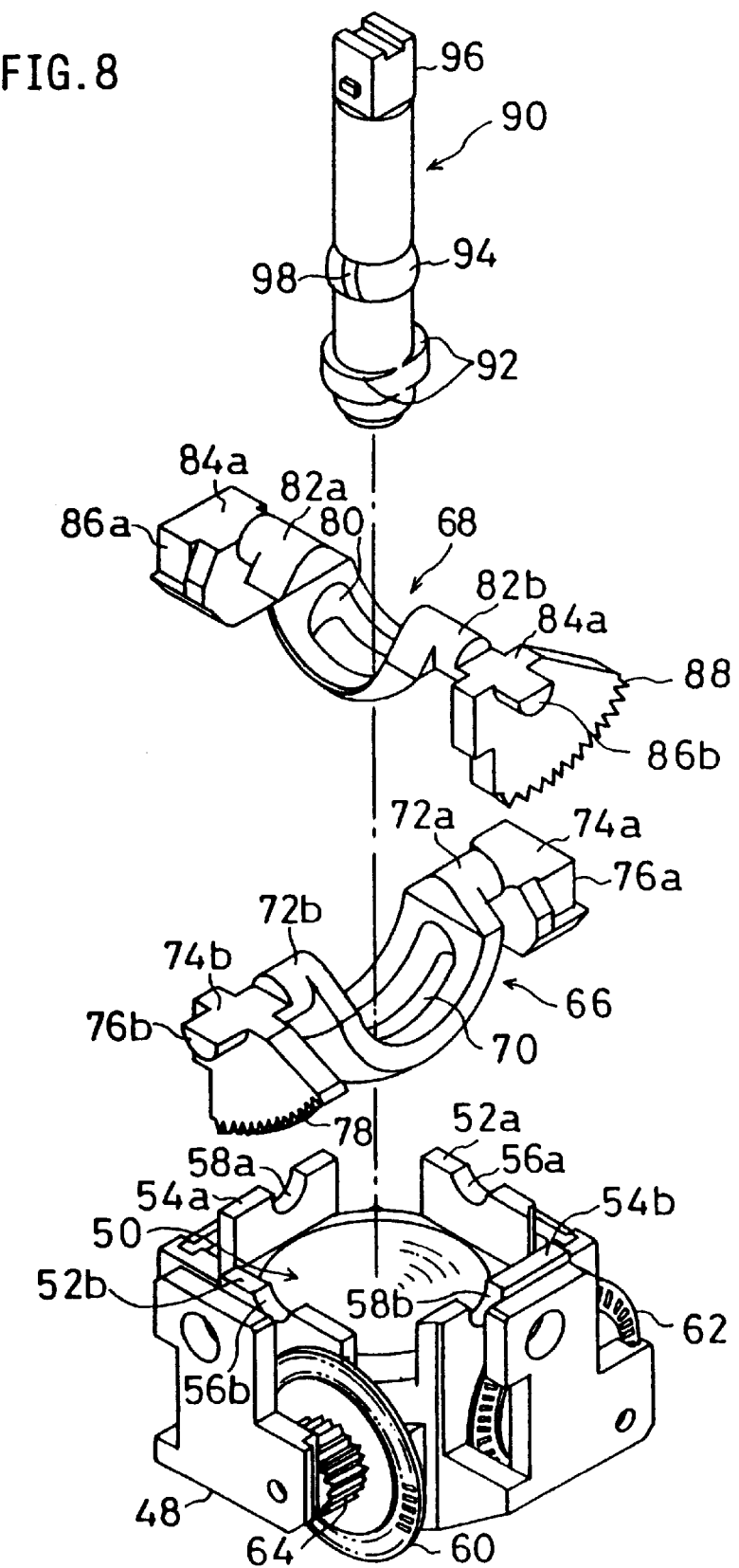
FIG. 8 is a fragmentary perspective view showing a major portion of the joystick unit of FIG. 6.

As shown in FIG. 7 and FIG. 8, the inner case 48 includes a bowl-shaped recess portion 50 formed at a center of the inner case 48, and two pairs of support plates 52a and 52b, and 54a and 54b are provided around the recess portion 50 with angle-interval of 90 degrees, and semicircular bearings 56a and 56b, and 58a and 58b are formed on the support plates 52a and 52b, and 54a and 54b, respectively. The bearings 56a and 56b or 58a and 58b are arranged on the same axis line, and axes of the bearings 56a and 56b, and 58a and 58b are at the same height level, and orthogonally intersected to each other. Slit wheels 60 and 62 having rotation shafts which orthogonally intersect to each other are rotatably supported at a side surface of the inner case 48, and gears 64 are uniformly formed on the respective slit wheels 60 and 62.

The analog joystick unit further includes swingable members 66 and 68. One swingable member 66 is formed by an arc-like member which is provided with a long hole being made long in a longitudinal direction of the arc-like member, and supporting shafts 72a and 72b are formed at both ends of the swingable member 66, and shaft end portions 76a and 76b respectively having flat surfaces 74a and 74b are extended from the supporting shafts 72a and 72b, and a sector gear 78 is provided on one shaft end portion 76b. The other swingable member 68 is different from the one swingable member 66 in that the swingable member 68 is constructed by an arc-like member having a radius of curvature smaller than that of the swingable member 66; however, in other aspects, the swingable member 68 is constructed in a manner similar to or the same the swingable member 66. That is, a reference numeral 80 denotes a long hole, reference numerals 82a and 82b denote supporting shafts, reference numerals 84a and 84b denote flat surfaces, reference numerals 86a and 86b denote shaft end portions, and a reference numeral 88 denotes a sector gear.

The supporting shafts 72a and 72b, and 82a and 82b are individually inserted into the two sets of bearings 56a and 56b, and 58a and 58b of the inner case 48, and therefore, the pair of swingable members 66 and 68 can be supported in a swing-free fashion, and the swingable members 66 and 68 are arranged so that the longitudinal directions of the long holes 70 and 80 orthogonally intersect to each other and are overlaid with an interval or gap. In the pair of swingable members 66 and 68 thus attached to the inner case 48, the sector gears 78 and 80 engage the above described gears 64. Furthermore, respective ones of the above described flat surfaces 74a and 74b, and 84a and 84b are included in the same horizontal plane in a neutral state of a lever 90 (described later).

As shown in FIG. 8, the lever 90 includes protrusions 92 which protrude toward outer radius directions at one end of the lever 90, and a ball portion 94 (expanded portion) at a middle portion of the lever 90, and a connection portion 96 at the other end of the lever 90. Grooves 98 which extend in a latitude direction at positions apart from each other by 180 degrees are formed on the above described ball portion 94. The diameter of the lever 90 is selected at a size which is not larger than the sizes of the short directions of the long holes 70 and 80 formed on the swingable members 66 and 68. Preferably, the diameter of the lever 90 is selected at a size by which the lever 90 can be slidably inserted into the long holes 70 and 80 without shaking. Then, the one end portion of the lever 90 penetrates through the long holes 70 and 80, and the protrusions 92 fit into the long hole 70 of a lower side swingable member 66. Therefore, the protrusions 92 of the lever 90 are arranged to protrude in a direction orthogonally intersected to the longitudinal direction of the long hole 80 of an upper swingable member 68 being attached to the inner case 48, and therefore, if the lever 90 is pulled-up, the protrusions 92 are prevented from being slipped-off by the upper swingable member 68.

Figure 6:
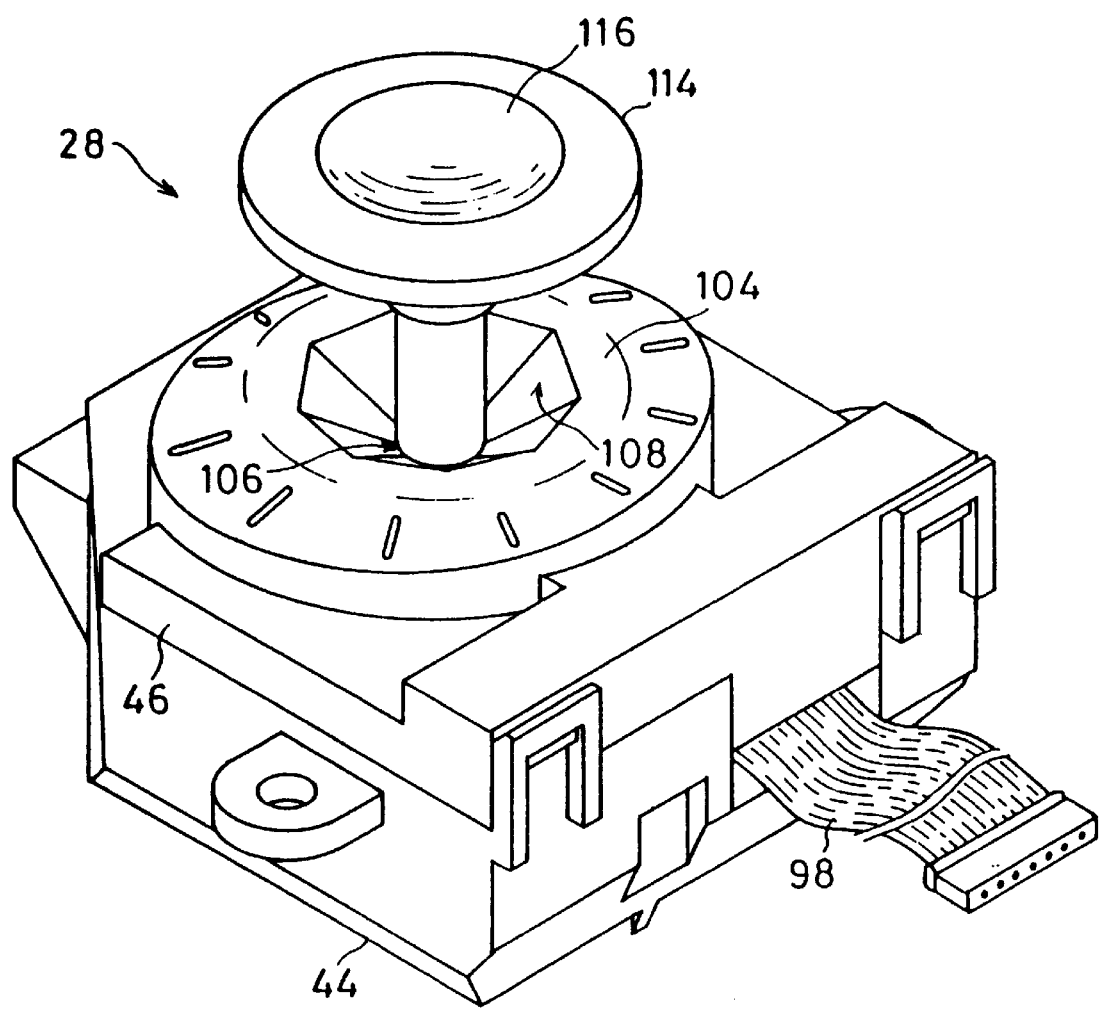
FIG. 6 is a perspective view showing an analog joystick unit which is capable of being utilized in the embodiment.

A mechanical structural portion assembled as shown in FIG. 7 is accommodated within the outer case 44 shown in FIG. 6. At this time, the inner case 48 is fixed to the outer case 44 by a suitable means such as screws (not shown). When the inner case 44 is thus attached to the outer case 44, light-emitting elements and light-receiving elements (not shown) arranged on the outer case 44 are opposite to the two slip wheels 60 and 62. In addition, the height level of swing-shafts (supporting shafts 72 and 82) of the swingable members 66 and 68 are coincident with a height level of a center of the ball portion 94. Furthermore, a printed-circuit board (not shown) to which a flexible wiring plate 98 is connected is assembled in the outer case 44, and the above described light-emitting elements and the light-receiving elements are electrically connected to printed patterns of the board.

Figure 9:
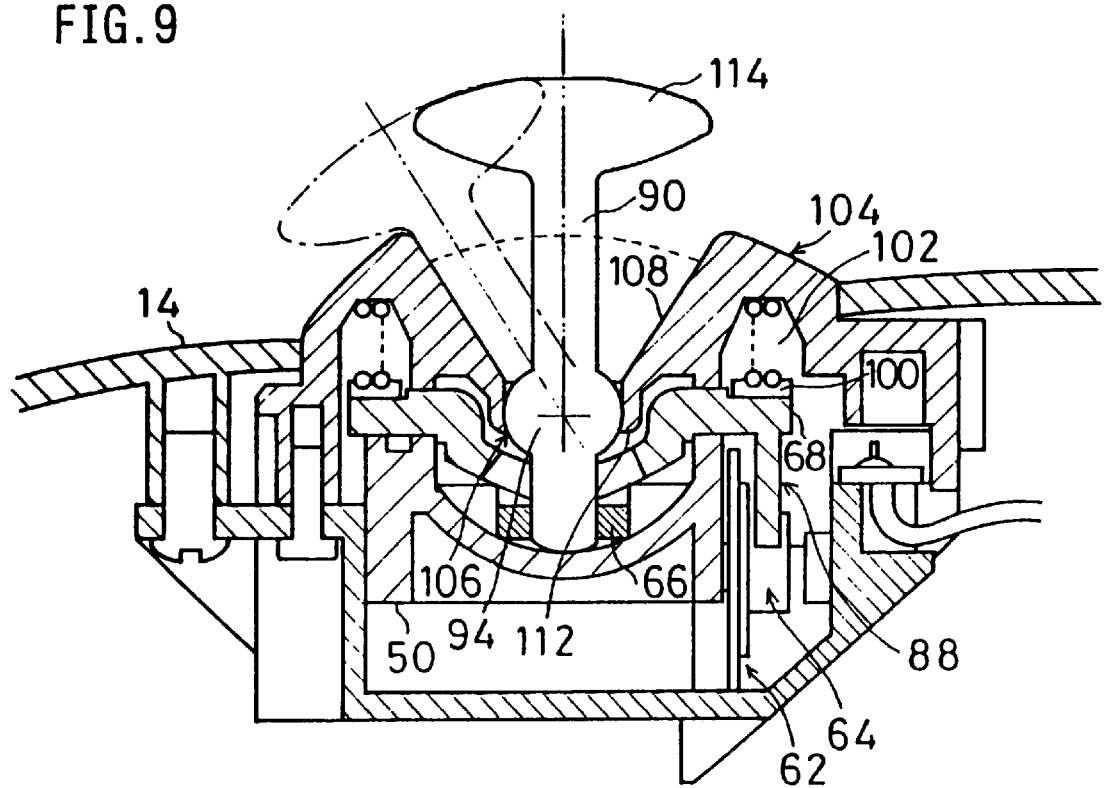
FIG. 9 is an illustrative view showing in cross-section a major portion of the joystick unit of FIG. 6.

As shown in FIG. 9, a groove ring 100 is supported above the flat surfaces 74 and 84 provided on the pair of swingable members 66 and 68, and a coil spring 102 is arranged above the groove ring 100. The groove ring 100 is one example of a pushing-down member, and in the neutral state of the lever 90, a lower surface of the ring 100 becomes in horizon, and the lower surface of the ring 100 and the above described flat surfaces 74 and 84 are brought into surface-contact with each other.

Figure 10:
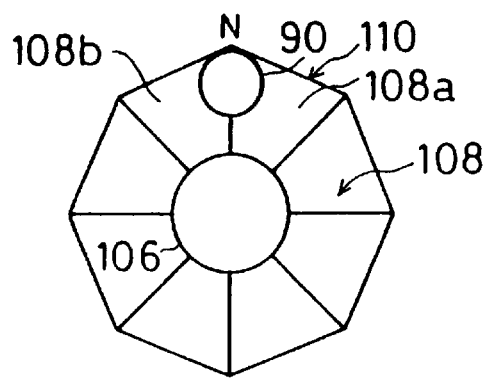
FIG. 10 is an illustrative view showing a guided state of a lever by a guide ring.

As shown in FIG. 6 and FIG. 9, a guide ring 104 is attached to the cover 46, and a circular hole 106 is formed at a center portion of the guide ring 104. The guide ring 104 further includes a guide wall 108 which is a rising slope raised from an inner periphery defining the hole 106 toward an outer periphery of the guide ring 104. That is, the guide wall 108 is formed as a whole in "an earthenware mortar" or "cone"-shape. Then, in viewing the guide wall 108 from above, the guide wall 108 has an outer edge 110 which becomes octagonal as shown in FIG. 10.

In addition, a diameter of the hole 106 is selected to a size that is the same or approximately the same as a diameter of an outer peripheral surface of the ball portion 94 of the above described lever 90. Therefore, as shown in FIG. 9, the inner edge defining the hole 106 is brought into contact with the ball portion 94 of the lever 90, and therefore, the lever 90 is supported by the ball portion 94 and the hole 106 in a manner that the lever 90 can be swung or inclined in any direction. Furthermore, circular bosses 112 are formed at two positions apart from each other by 180 degrees on the inner edge defining the hole 106 of the guide ring 104 in a manner that the bosses 112 protrude toward an inner radius direction of the hole 106, and the bosses 112 individually fit into the grooves 98 formed in the latitude direction of the above described ball portion 94. Therefore, the lever 90 can be swung around an axis of the bosses 112, but the lever 90 can not be rotated around the axis of the lever 90 itself. Therefore, the lever 90 is prevented from being rotated around its axis by the grooves 98 of the ball portion 94 and the bosses 112.

Furthermore, if the cover 46 is attached to the case 44, the spring 102 is sandwiched and compressed between the ring groove 100 and the cover 46. Therefore, the flat surfaces 74 and 84 of the pair of swingable members 66 and 68 are always depressed by a force of the spring 102 via the groove ring 100, and by such a depression free, the pair of swingable members 66 and 68 are always elastically biased so that attitude of both members 66 and 68 is not in any direction, and therefore, the lever 90 has a vertical attitude, that is, the lever 90 is always elastically biased its neutral state.

The lever 90 is provided with an operating knob 114 which is attached to the lever 90 via the connection portion 96. On an upper surface of the operating knob 114, a recess portion 116 is formed such that a finger of the hand can be easily put on the knob 114.

In the above described analog joystick unit, according to an inclined direction and an inclined angle of the lever 90, the swingable members 66 and/or 68 are swung, and then, the slit wheels 60 and/or 62 are rotated in accordance with the inclined angle of the swingable members (or transfer members) 66 and/or 68, and therefore, pulses according to rotation amounts of the slit wheels 60 and/or 62 are outputted, and the pulses are utilized as coordinate signals in an X axis and/or a Y axis directions.

Now, the guide ring 104 will be described in detail. As described above, the guide ring 104 includes the guide wall 108 having the octagonal outer edge 110 in viewing the guide ring 104 from above. Respective corners of the octagonal outer edge 110 function as recess portions which receive the lever 90 as shown in FIG. 10. Therefore, in this embodiment shown, the respective corners are positioned at eight positions with intervals of 45 degrees of up (North), down (South), left (West), right (East), a center position between up and left (North-West), a center position between up and right (North-East), a center position between down and left (South-West) and a center position between down and right (South-East). As to a point N indicative of up (North) shown in FIG. 10, guide walls 108a and 108b which sandwich the point N converge at the point N. That is, the both guide walls 108a and 108b intersect to each other, and the position that they intersect is the point N. Therefore, if the lever 90 is inclined toward the point N, the lever 90 is moved along with the guide walls 108a and 108b sandwiching the point N, that is, the lever 90 is guided by the guide walls 108a and 108b, and finally, positioned at the point N. Therefore, when the movable character (not shown) on the monitor (not shown) is intended to be moved upward, for example, that is, when the movable character is to be moved in a straight-going direction of the movable character, the lever 90 may be inclined toward the point N. That is, when the movable character is to be advanced straight, if the lever 90 is inclined toward a vicinity of the point N, the lever 90 is restricted at the point N along with the guide walls 108a and 108b adjacent to the point N, and therefore, only by holding such a state, it is possible to surely advance the movable character straight.

Furthermore, a sloped angle of the guide wall 108 of the guide ring 104 is determined in a manner that the lever 90 at a position that the lever 90 is inclined at maximum inclination is along with the guide wall 108 (becomes in parallel to each other) as shown in FIG. 9. That is, where the lever 90 is inclined in any direction up to a maximum inclination position, the lever 90 is brought into contact with the guide wall 108 in parallel to each other. Therefore, the guide wall 108 functions as described above, lever guide as well as a lever stopper which stops the lever 90 at the maximum inclination position. Therefore, even if the lever 90 is erroneously stamped, a further inclination of the lever 90 is stopped by the guide wall 108, and therefore, the lever 90 is prevented from being destroyed.

Figure 11:
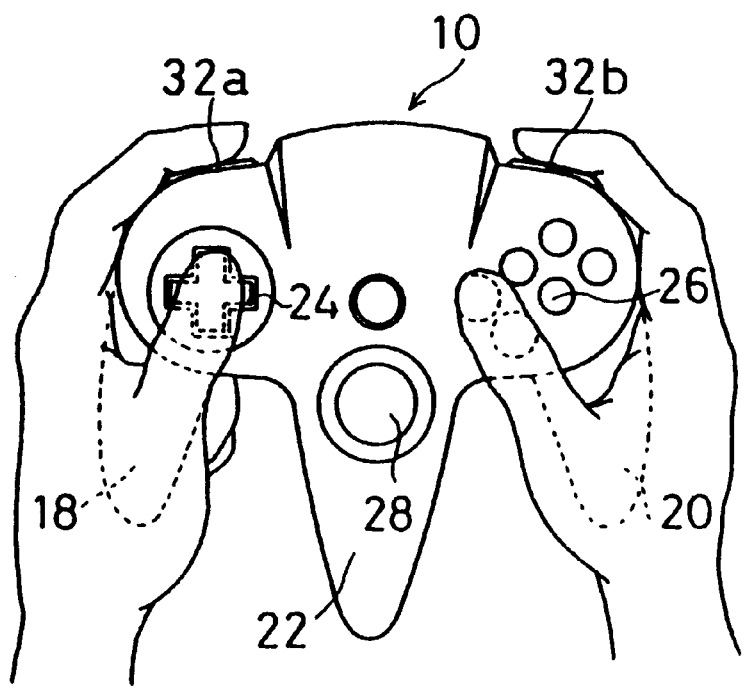
FIG. 11 is a top plan view showing one example of an operation status of the embodiment of FIG. 4.
Figure 12:
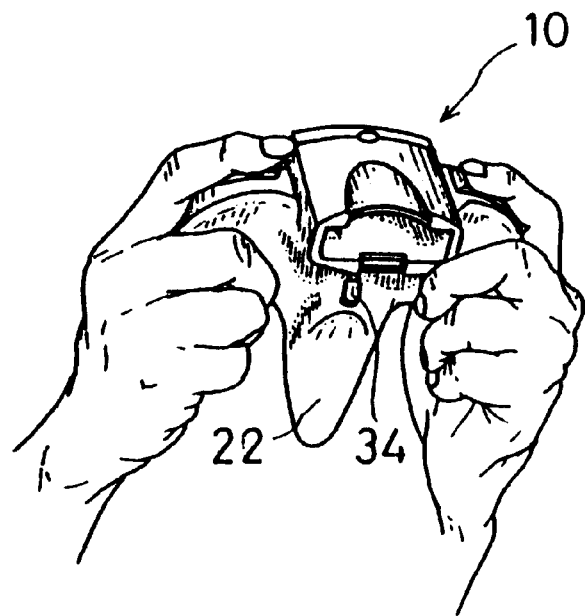
FIG. 12 is a perspective view of the operation status shown in FIG. 11 while being viewed from a rear side.
Figure 13:
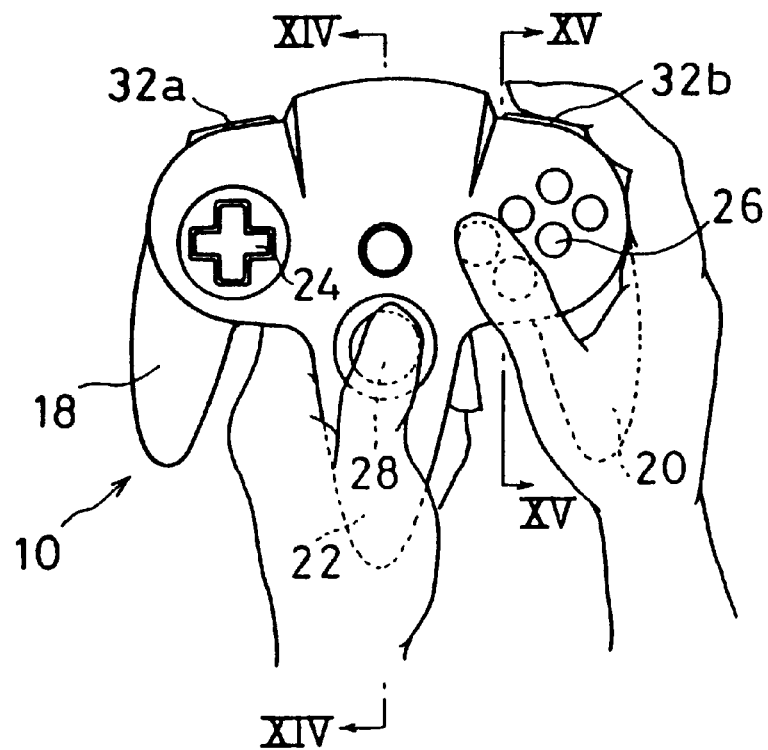
FIG. 13 is a top plan view showing another example of an operation status the embodiment of FIG. 4.

FIG. 11 to FIG. 16 are illustrative views showing states where the controller 10 of this embodiment is held by hand(s), and FIG. 11 and FIG. 12 show a state where the controller 10 is held by a first holding method, and FIG. 13 shows a state where the controller 10 is held by a second holding method.

In FIG. 11 and FIG. 12, the operator brings the left grips 18 and the right grips 20 into contact with recessed portions which are formed at centers of palms of the right and left hands, and in such a state, by hooking middle fingers, third fingers and little fingers of the both hands along with the grips, the left and right grips 18 and 20 are held. Each of the left and right grips 18 and 20 is selected in an egg shape which is approximately the same as the shape of the recessed portion formed at the center of the palm at a time that the fingers slightly hooked in a state where the hand holds nothing, and therefore, it is possible for the operator to naturally hold the grips 18 and 20 with no gripping force. At this time, since the center portions of the grips 18 and 20 are thicker than the base end portions and the tip end portions, even if the grips 18 and 20 are softly grasped, the grips 18 and 20 can not fall from the hands. Furthermore, as with children or adults, there are differences between individuals in a size of the hand; however, since the grips 18 and 20 have no grooves as are formed in the third prior art controller, and since and the grips 18 and 20 are formed by smooth curved surfaces, it is possible for operators to freely select a holding position in accordance with the size of their hands.

Figure 15:
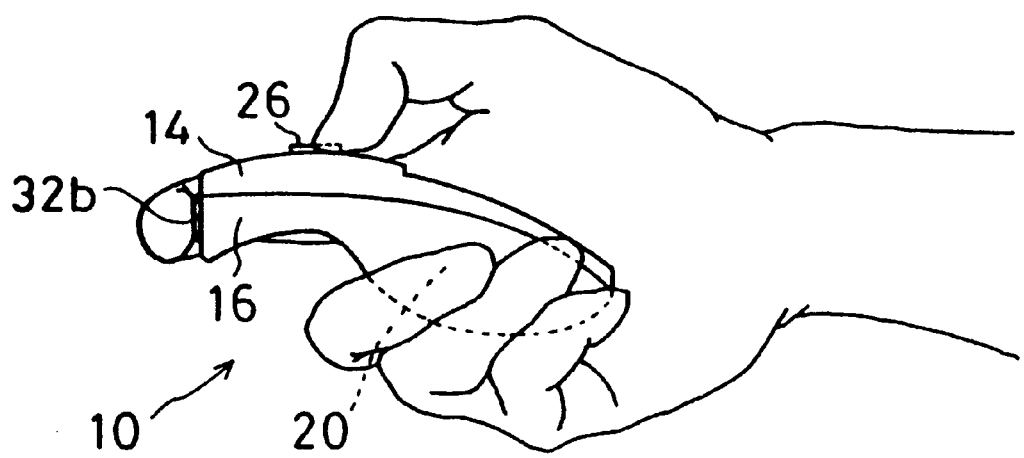
FIG. 15 is an illustrative view showing a positional relationship between the hands and the controller at a line XV in FIG. 12.
Figure 16:
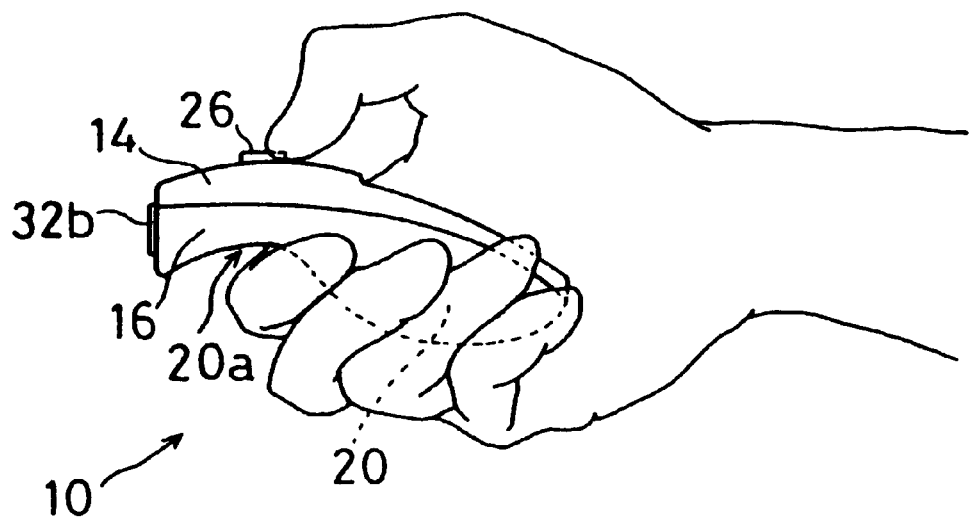
FIG. 16 is an illustrative view showing a holding state of a right grip while a side surface switch is not operated.

If the grips 18 and 20 are thus held, thumbs are positioned above the respective switches 24 and 26a to 26f being arranged on axis lines of the grips 18 and 20. As shown in FIG. 15 and FIG. 16, the axis lines of the grips 18 and 20 are curved, and therefore, the thumbs can be brought into contact with the respective switches 24 and 26a to 26f where the thumbs are slightly hooked, and therefore, it is not necessary to forcibly turn the thumbs. Accordingly, no burden is applied to the fingers, and therefore, it is difficult for the operator to become tired, and the feel of the operation is good.

FIG. 13 shows a state where the center grip 22 is held differently from the holding method shown in FIG. 11 and FIG. 12. In FIG. 13, the center grip 22 is held by a left hand, and the right grip 20 is held by a right hand; however, according to the game content, the left grip 18 and the center grip 22 may be held by the left hand and the right hand, respectively. By holding the controller as shown in FIG. 13, instead of the cross direction switch 24, the operator can operate the analog joystick 28. The cross direction switch 24 can designate only four directions (eight directions according to the program); however, the analog joystick 28 can designate an arbitrary direction of 360 degrees, and input a strength in that designated direction according to a degree of the inclination of the above described lever 90. Accordingly, it is possible to move the movable character in a desired direction at a desired speed.

Figure 14:
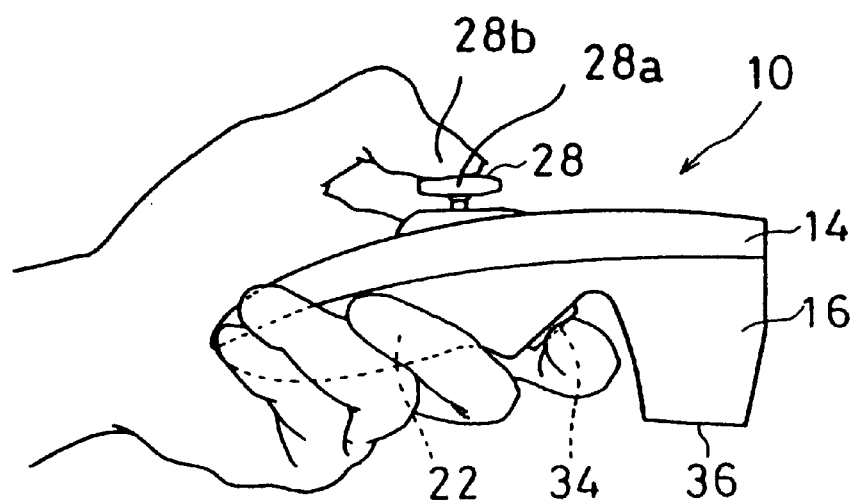
FIG. 14 is an illustrative view showing a positional relationship between a hand and a controller at a line XIV—XIV in FIG. 13.

As shown in FIG. 14, if the center grip 22 is held, the bottom surface switch 34 formed on the bottom surface can be also operated. The recess portion is formed on the bottom surface of the center grip 22, and therefore, the center grip 22 can be grasped while the middle finger, the third finger and the little finger are not forcibly opened. A portion between a portion that the bottom surface switch 34 is formed and the recess portion is protruded as a hill, and therefore, by bringing the middle finger into contact with the hill, the holding position is determined. The portion in which the bottom surface switch 34 is formed is constructed by a slope which orthogonally intersects to a direction that the index finger is hooked, and therefore, the bottom surface switch 34 is easily depressed by the index finger. The joystick 28 can be controlled by placing the finger cushion 28b of the thumb on the disc-like putting-on portion 28a of the joystick 28.

In reverse to FIG. 13, in a case where the left grip 18 and the center grip 22 are respectively held by the left hand and the right hand, it becomes possible to designate two kinds of directions. For example, an advancing direction of the game character is designated by the cross direction switch 24, and a direction of the character's eyes can be designated by the analog joystick 28. In such a case, it is possible to find-out an enemy pressing from a side of the character while the character does not face the enemy. If an aiming direction of a weapon is designated by the analog joystick 28, it is possible to attack an enemy pressing from directions other than the advancing direction of the character without changing the advancing direction of the character.

Furthermore, it is possible to hold the center grip 22 only. In this case, the bottom surface switch 34 is used as an attack switch, and by aiming at the enemy by the analog joystick 28, it is possible to easily implement a shooting game that is required to provide a mechanism for sensing the aiming direction by an infrared ray or the like in the prior art.

FIG. 15 shows a holding state of the center grip 22 in a case where the side surface switch 32b is operated while the right grip 20 is held. The right grip 20 is held by three fingers of the middle finger, the third finger and the little finger. If the switch 32b is not to be operated, as shown in FIG. 16, the grip 20 is held by four fingers of the index finger, the middle finger, the third finger and the little finger. In any holding method, since no grooves are formed on a surface of the grip which is constructed by a smooth curved surface, there is no possibility that a hold feeling is detracted.

Furthermore, as mentioned in the above, vicinities of the base ends of the grips 18, 20 and 22 are formed as recess portions 18a, 20a and 22a each having a thickness less than a thickness of a center portion of the grip. If the controller 10 is held by the recess portions 18a, 20a and 22a, an interval or gap occuring between the thumb and the index finger is narrow. Therefore, it is possible to hold the grip with natural curves of the fingers while it is unnecessary to largely return the thumb. Therefore, if the controller is used for a long time, the finger or the hand is not tired, and therefore, it is unnecessary to stop the game due to a pain of the finger or the hand, and accordingly, interest in of the game is not detracted. Furthermore, the analog joystick 28 can designate all directions of 360 degrees with a slight incline a finger tip of the thumb while the same is not grasped by the palm of the hand, and therefore, if the controller is used for long time, there are very few occasions that a wrist is tired, and therefore, an operability is very good.

FIG. 17 and FIG. 18 are perspective views showing the expansion cartridge 38 inserted into the opening portion 36 shown in FIG. 5. The cartridge 38 accommodates a printed-circuit board 116 on which semiconductor devices (not shown) are mounted. As the semiconductor devices, a read-only-memory (ROM) or a writable memory (RAM) is mounted, for example. In a case where the ROM is mounted, it is possible to store in the ROM an additional program for making an up-graded version of a game program which has been put into practical use. In a case of the RAM, it is possible to save renewed data in progressing the game in the RAM. If upgraded version data is stored, in a game that a main program is not changed while data of abilities of teams are to be renewed every year such as a baseball game, for example, it is possible to play the game on the basis of the new data only by obtaining the expansion cartridge 38 into which the upgraded version data is stored, and therefore, it is unnecessary to change the game program itself.

If the renewed data in progressing the game is to be saved, in a horse race game, for example, by storing the data of a racing horse bred by a given player in the RAM, it is possible to bring a racing horse bred by another player into competition. More specifically, a plurality of players breed racing horses according to a game program, and data of the horses are saved in the RAM of the cartridge 38. Respective players come together each with the cartridges 38 in each of which the data of the racing horse bred by himself is saved, and the cartridge 38 is connected to the connector within the opening portion 36 of the controller 10. Thereafter, only by reading-out the data of the respective players according to the game program, individual data can be utilized without inputting redundant passwords. Furthermore, since the cartridge 38 is detachably attached to the controller 10, there is no troublesomeness that the player carries about the controller 10, and further, it is not necessary to newly obtain the controller for each game. Accordingly, it is possible to easily and inexpensively enjoy a battle game by the plurality of players.

Furthermore, in a case where the connector to which the expansion cartridge is connected is formed on the game machine unit, since it is unclear how many players simultaneously use the game machine unit, it is unclear how many connectors are to be formed on the game machine unit. Furthermore, a cost of the game machine unit rectifies the number of the connectors, and therefore, it is impossible to form a large number of connectors on the game machine unit. Furthermore, in a case where the connectors are formed on the game machine unit, it is necessary to distinguish the expansion cartridge and the player in one by one manner, and therefore, a burden is applied to the processing ability of the game machine. Therefore, in the controller 10 of this embodiment, since the connector to which the expansion cartridge 38 is attached is formed on the controller 10, it is unnecessary to form the connectors on the game machine unit, and accordingly, there is no problem with how many connectors are to be formed on the game machine unit and etc. the like. Furthermore, it is unnecessary to provide a further means by which the expansion cartridge and the player are individually distinguished.

As described in the above, a semicircular protruded portion 118 which corresponds to the arc-like notch portion 42 of the opening portion 36 is formed at a front surface side of the cartridge 38. In a bottom portion of a rear surface, an engaging recess portion 120 which engages with an engaging member (not shown) of the lever 40 is formed. A tapered portion 112 is formed on a bottom surface side of the engaging recess portion 120, and therefore, the tapered portion 112 assists insertion of the engaging member of the lever 40 into the engaging recess portion 120. If the cartridge 38 is to be ejected, first, by depressing the lever 40, an engagement state of the engaged member and the engaged recess portion 120 is released. Next, by pressing the protruded portion 118 by a finger and by bringing the finger down, the cartridge 38 is ejected from the opening portion 36. Now, by reversing a relationship between the engaging recess portion 120 formed on the cartridge 38 and the engaging protrusion (not shown) formed on the lever 40, the engaging protrusion may be formed on the cartridge 38 and the engaging recess portion may be formed on the lever 40.

Furthermore, the cartridge 38 is formed in a manner that a front side and a rear side of the cartridge is asymmetric, and therefore, the cartridge 38 is prevented from being inserted into the opening portion 36 in a reverse direction of the front side and the rear side. Furthermore, notch portions 124 for preventing an unsuitable cartridge from being inserted into the opening portion 36 are formed at the left and right of the engaging recess portion 120, and in correspondence thereto, protrusions (not shown) are formed in the interior of the opening portion 36.

In general, the above described cartridge 38 is inserted into the opening portion 36; however, it is possible to insert other function expansion devices without limited to cartridges if the devices have the same bottom shape as that of the cartridge 38. As one example of such devices, it is possible to consider that an external monitor which comprises a small liquid crystal display screen is attached to the opening portion 36. In this case, when a plurality of players simultaneously play a game, data necessary for progressing the game but to be hidden from other players is not displayed on a common monitor, and such data may be displayed on the liquid-crystal display screen (external monitor). In a mahjong game, for example, a plurality of players simultaneously play the game, a conventional game machine is provided with only a single monitor screen, and therefore, it was impossible to make players' hands secret. However, if the cartridge having the external monitor such as a liquid-crystal display device is attached to the controller 10 of the embodiment and a player's hand is displayed on the external monitor, it is possible for the player to progress his hand while his hand is not seen by the other players. Furthermore, discarded mahjong-pais are displayed on the common monitor screen such that the other players can make "pong" or "chi" of the discarded mahjong-pais.

Furthermore, as shown in FIG. 5, since the opening portion 36 is formed in a manner that the opening portion 36 protrudes toward the bottom surface at a rear side end portion opposite to the grips 18, 20 and 22, the controller 10 has four legs. Therefore, it is possible for the operator not only to hold the controller 10 with the hands but also to use the controller which is placed on a desk. In this case, the operator can stably operate the controller by only softly depressing the respective switches. Furthermore, if the controller 10 is placed on the desk, the operator can more freely move the hands in comparison with a case that the controller 10 is held by the hands, and the controller 10 is stable without any intentions to depress the controller, and therefore, the operator's hand is not tired in playing the game.

Figure 21:
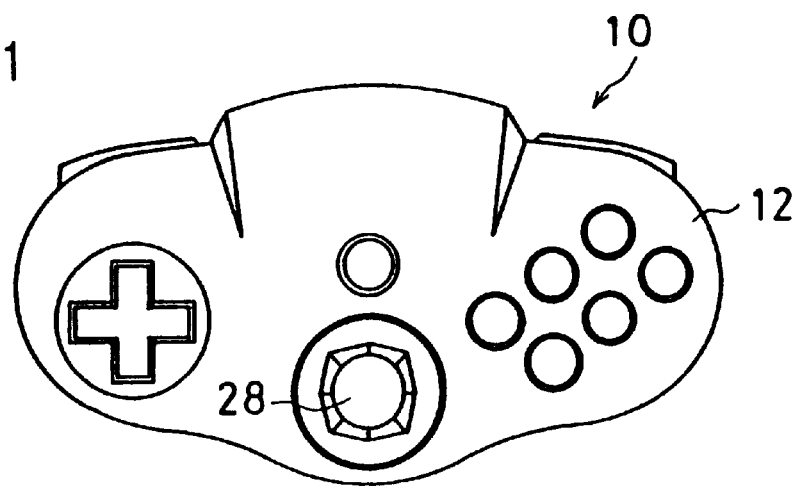
Figure 22:
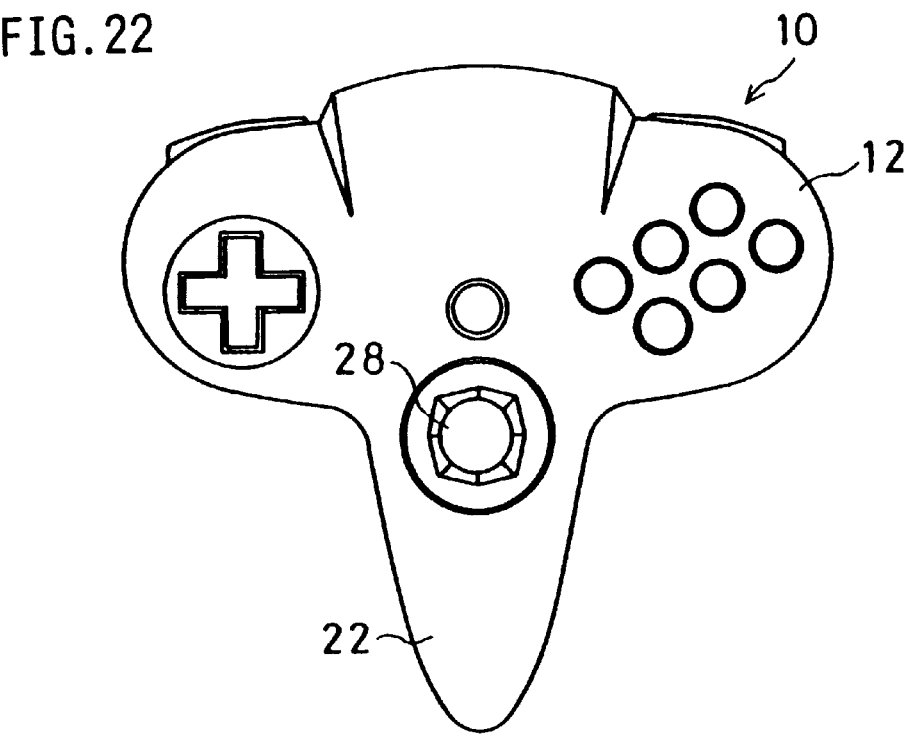

In addition, in the embodiment shown in FIG. 4 and FIG. 5, the three grips 18, 20 and 22 protrude from the housing 12. However, all or an arbitrary one or two grips of the grips 18, 20 and 22 may be removed as shown in FIG. 19 to FIG. 22. If grip is provided, the at least one grip, a stability in operating the letter 90 of the analog joystick 28 can be secured. Furthermore, in a case where all the grips are removed as shown in FIG. 21, if the aforementioned guide ring 104 is provided with the analog joystick 28, there is no possibility that the stability of the operation of the lever 90 of the analog joystick 28 is obstructed.

Furthermore, the guide ring 104 of the above described embodiments is formed as an octagonal shape in a top plan view, and therefore, if the respective corners are positioned at up (North), right-up (North-East), right (East), right-down (East-South), down (South), left-down (South-West), left (West) and left-up (West-North), it is possible to securely incline the lever 90 in any one of the above described directions. However, a corner or recess portion of the guide ring 104, which receives the lever 90, may be formed at least a point indicative of North, and in such a case, it is possible to stably advance the movable character straight. Furthermore, the recess portion need not be the corner and may be a notch in which the lever 90 can be received.

Furthermore, in the above described embodiments, as an analog joystick, a device is described which has a lever and obtains a direction signal by inclining the lever; however, a track ball, a jog shuttle or the like may be utilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operating device for use with an image processing apparatus which generates image data to be displayed on a monitor, and outputs an operation signal which can apply a change on said image, said operating device comprising:
   a hand-holdable housing; and
   an analog joystick provided on said housing, wherein said analog joystick includes
      an operating lever having a tip end which is protruded from said housing and can be inclined in an arbitrary direction including up, down, left and right within 360 degrees, and
      a guide member which is fixedly formed on said housing and is operable to guide said operating lever in at least an up direction, said guide member including a wall surface which is sloped with an outside upper portion such that said operating lever is brought into contact with said wall surface at a maximum inclination position of said operating lever.

2. An operating device according to claim 1, wherein said wall surface sandwiches a point to which said operating lever is to be guided and converged at said point.

3. An operating device according to claim 2, wherein said wall surface includes a corner portion which receives said operating lever at said point.

4. An operating device according to claim 1, wherein a width of said wall surface is slightly smaller than a length of said operating lever.

5. An operating device according to claim 1, wherein said wall surface of said guide member guides said operating lever at least four directions including up, down, left and right.

6. An operating device according to claim 5, wherein a width of said wall surface is slightly smaller than a length of said operating lever.

7. An operating device according to claim 1, wherein said wall surface of said guide member guides said lever in at least eight directions of up, down, left and right, and intermediate positions therebetween.

8. An operating device according to claim 7, wherein a width of said wall surface is slightly smaller than a length of said operating lever.

9. An operating device according to claim 1, further comprising a grip uniformly formed on said housing in a manner that said grip is extended toward a front side of said housing.

10. An operating device according to claim 9, wherein said grip includes a base end portion connected to said housing, a tip end portion and a center portion between said base end portion and said tip end portion, said center end portion being made to be thicker than other portions.

11. An operating device according to claim 10, further comprising a recess portion formed on a rear surface of said housing in the vicinity of said base end portion of said grip.

12. An operating device according to claim 9, further comprising an operating switch arranged on a rear surface of said housing at a position to which an index finger of a hand grasping said grip can reach.

13. An operating device according to claim 9, wherein said analog joystick includes a disc-like putting-on portion formed at a tip end of said operating lever, and a finger cushion of a thumb of the hand grasping said grip is put on said putting-on portion to incline said operating lever.

14. An operating device for use with an image processing apparatus which generates image data to be displayed on a monitor, and outputs an operation signal which can apply a change on said image, said operating device comprising:
   a hand-holdable housing; and
   an analog joystick provided on said housing, wherein said analog joystick includes
      an operating lever having a tip end which is protruded from said housing and can be inclined in an arbitrary direction including up, down, left and right within 360 degrees, and
      a guide member which is fixedly formed on said housing and is operable to guide said operating lever in at least an upward direction of said guide member including a wall surface which is sloped with outside upper portion such that said operating lever is brought into contact with said wall surface at a maximum inclination position of said operating lever, said wall surface including a corner portion which receives said operating lever at a point to which said operating lever is to be guided and a width of said wall surface being slightly smaller than a length of said operating lever.

15. An operating device according to claim 14, wherein said analog joystick includes a disc-like putting-on portion formed at a tip end of said operating lever, and a finger cushion of a thumb of the hand grasping said grip is put on said putting-on portion to incline said operating lever.

16. An operating device for use with an image processing apparatus which generates image data to be displayed on a monitor, and outputs an operation signal which can apply a change on said image, said operating device comprising:

a hand-holdable housing; and an analog joystick provided on said housing, wherein said analog joystick includes an operating lever having a tip end which is protruded from said housing and can be inclined in an arbitrary direction including up, down, left and right within 360 degrees, and a cone-shaped guide member which is fixedly formed on said housing, wherein said operating lever is formed with a expanded portion at a lower portion thereof, and said guide member pivotally supports said expanded portion of said operating lever at a bottom portion thereof and includes a wall surface which is sloped with upper portion outside such that a portion of said operating lever above said expanded portion is brought into contact with said wall surface at a maximum inclination position of said operating lever, a width of said wall surface being smaller than a length of said operating lever.

17. An operating device according to claim 16, wherein said width of said wall surface is selected to be equal to or smaller than said length of said operating lever.

18. An operating device according to claim 16, wherein said analog joystick includes a disc-like putting-on portion formed at a tip end of said operating lever, and a finger cushion of a thumb of the hand grasping said grip is put on said putting-on portion to incline said operating lever.

19. An operating device according to claim 16, further comprising a transfer member which is engaged to a lower end of said operating lever and withdraws an inclined direction and an inclination amount of said operating lever.

* * * * *